United States Patent
Joiner

(10) Patent No.: US 7,549,863 B1
(45) Date of Patent: Jun. 23, 2009

(54) METHODS OF PLAYING CARD GAMES COMPRISING SAYING THE ALPHABET WITH WORDS, SAYING WORDS WITH WORDS, AND SAYING THE ALPHABET WITH WORDS WHILE SAYING WORDS WITH WORDS

(76) Inventor: Timothy Gerard Joiner, 336 Yosemite Dr., Livermore, CA (US) 94551

( * ) Notice: Subject to any disclaimer, the term of this patent is extended or adjusted under 35 U.S.C. 154(b) by 0 days.

(21) Appl. No.: 12/286,616

(22) Filed: Oct. 1, 2008

Related U.S. Application Data

(63) Continuation-in-part of application No. 12/074,896, filed on Mar. 7, 2008, now abandoned.

(51) Int. Cl.
*G09B 19/22* (2006.01)
(52) U.S. Cl. ........................ 434/129; 434/155
(58) Field of Classification Search ................ 434/128, 434/129, 159, 157, 167, 156; 273/272, 299, 273/302, 429, 430
See application file for complete search history.

(56) References Cited

U.S. PATENT DOCUMENTS

| | | | | | |
|---|---|---|---|---|---|
| 1,271,856 | A | * | 7/1918 | Cook | 273/293 |
| 2,783,998 | A | * | 3/1957 | Collins | 273/299 |
| 4,519,606 | A | * | 5/1985 | Lussiez | 273/429 |
| 4,911,448 | A | * | 3/1990 | Thomas | 273/142 R |
| 4,923,199 | A | * | 5/1990 | Hahn | 273/299 |
| 5,005,160 | A | * | 4/1991 | DeMars | 368/95 |
| 5,108,113 | A | * | 4/1992 | Leach | 273/302 |
| 5,133,560 | A | * | 7/1992 | Small | 463/9 |
| 5,417,432 | A | * | 5/1995 | Dwyer | 273/299 |
| 5,645,280 | A | * | 7/1997 | Zelmer | 273/256 |
| 5,863,042 | A | * | 1/1999 | Lo | 273/292 |
| 5,906,492 | A | * | 5/1999 | Putterman | 434/169 |
| 6,168,439 | B1 | * | 1/2001 | Anderson | 434/167 |
| 6,182,966 | B1 | * | 2/2001 | Wells et al. | 273/236 |
| 6,234,486 | B1 | * | 5/2001 | Wallice | 273/299 |
| 6,276,940 | B1 | * | 8/2001 | White | 434/172 |
| 6,623,009 | B1 | * | 9/2003 | Kraemer et al. | 273/272 |
| 6,948,938 | B1 | * | 9/2005 | Tseng | 434/129 |
| 7,029,281 | B1 | * | 4/2006 | Rathyen | 434/129 |
| 2002/0119812 | A1 | * | 8/2002 | Letang | 463/9 |
| 2007/0069465 | A1 | * | 3/2007 | Kilbane | 273/272 |

* cited by examiner

*Primary Examiner*—Kurt Fernstrom

(57) ABSTRACT

Method of Playing Card Games Consisting of Saying The Alphabet With Words and Saying Words With Words and Saying The Alphabet With Words While Saying Words is an enunciation game recognizing the pronunciation of letters as alphabet letters and the enunciation of additional words during the enunciation of any one word.

3 Claims, No Drawings

METHODS OF PLAYING CARD GAMES COMPRISING SAYING THE ALPHABET WITH WORDS, SAYING WORDS WITH WORDS, AND SAYING THE ALPHABET WITH WORDS WHILE SAYING WORDS WITH WORDS

CROSS-REFERENCE TO RELATED APPLICATIONS

This application is a continuation in part of application Ser. No. 12/074,896 filed Mar. 7, 2008 now abandoned.

STATEMENT REGARDING FEDERALLY SPONSORED RESEARCH OR DEVELOPMENT

None

REFERENCE TO SEQUENCE LISTING, A TABLE, OR A COMPUTER PROGRAM LISTING COMPACT APPENDIX

None

BACKGROUND OF THE INVENTION

This application is a continuation in part to application Ser. No. 12/074,896 This invention falls into the field of educational games.

BRIEF SUMMARY OF INVENTION

Saying The Alphabet With Words is an enunciation game that identifies the pronunciation of letters as alphabet letters in the enunciation of any one word. Saying Words With Words is an enunciation game that identifies additional words during the enunciation of any one word. Saying The Alphabet With Words While Saying Words With Words is an enunciation game that identifies the pronunciation of letters as alphabet letters and the enunciation of additional words during the enunciation of the same one word.

BRIEF DESCRIPTION OF THE SEVERAL VIEWS OF THE DRAWING

None

DETAILED DESCRIPTION OF THE INVENTION

What is Means

I. The enunciation of any word in the English language that pronounces a letter or letter's from the alphabet as an alphabet letter earns I point per letter pronounced as an alphabet letter and this game is referred to as Saying The Alphabet With Words.
  Examples:
    1. The word MAKE pronounces the letter A as an alphabet letter and the letter A is worth 1 point
    2. The word SHOW pronounces the letter O as an alphabet letter and the letter O is worth 1 point.
    3. The word EAT pronounces the letter E as an alphabet letter and the letter E is worth 1 point.
    4. The word MARIE pronounces the letter E as an alphabet letter. The letter E earn 1 point.
    5. The word CELEBRATE pronounces the letter L and A as alphabet letters and the letter L and A are worth 1 point each for a total of 2 points.
    6. The word MICROWAVE pronounces the letter I, O, and A as alphabet Letters and the letters I, O, and A are worth 1 point each for a total of 3 points.
    7. The word GAINSAY pronounces the letter A as an alphabet letter two times each time worth 1 point for a total of 2 points.
    8. The word SELENIUM pronounces the letter E as an alphabet letter two times. Each time is worth 1 point for a total of 2 points.
    9. The word BELL pronounces the letter L as an alphabet letter Although there are two L's in the spelling of the word BELL, the letter L is pronounced only once. Therefore, the word BELL is worth 1 point.
    10. The word MAYBE pronounces the letters A, B, and E as alphabet letters. This word is worth 3 points because three different letters from the alphabet are pronounced as alphabet letters, each letter being worth 1 point.
    11. The word BEEHIVE pronounces the letters B, E, and I as alphabet letters. This word is worth 3 points because three different letters from the alphabet are pronounced as alphabet letters, each letter being worth 1 point.
    12. The word SEA pronounces the letter C and E as an alphabet letter. The word SEA is worth 2 point for the pronunciation of the letter C.

II The enunciation of any word in the English language that enunciates other words during its enunciation earns 1 point per additional word enunciated this is referred to as Saying Words with Words.
  Examples:
    1. The word BASH enunciates the word ASH. The word ASH earns 1 point.
    2. The word FAN enunciates the word AN. The word AN earns 1 point.
    3. The word FARE enunciates the word AIR. The word AIR earns 1 point.
    4. The word I enunciates the word EYE. The word EYE earns point.
    5. The word HAZMAT enunciates the word AS, the word MAT, and the word AT. AS earns 1 point, MAT earns 1 point, and AT earns 1 point. The word HAZMAT is worth a total of 3 point.

III. The enunciation of any word in the English Language that pronounces a letter or Letters from the alphabet as an alphabet letter and enunciates other words during the enunciation earns 1 point per letter pronounced as an alphabet letter and 1 point per additional word enunciated this is referred to as Saying The Alphabet While Saying Words With Words.

All the rules applied in I, II, are combined to form III.
  Examples
    1. The word LOIS pronounces the letter O as an alphabet letter. The letter O earns 1 point. The word LOIS enunciates the word LOW and OH and OWE. The word LOW and the word OH and the word OWE are each worth 1 point. The word LOIS is worth 4 points.
    2. The word ROYALTY pronounces the letter T and E as an alphabet letter. letter earns 1 point. The word ROYALTY enunciates the word ROY. The word ROY earns 1 point. The word ROYALTY earns a total of 3 points.
    3. The word GYMNASIUM pronounces the letter A and the Z as alphabet letters. The letter A earns 1 point and the letter Z earns point. The word GYMNASIUM enunciates the word JIM. The word JIM earns 1 point. The word GYMNASIUM earns a total of 3 points.

How to Play

1. Saying The Alphabet with Words

A method of playing a card game by a plurality of players; comprising (a) providing a deck of 52 playing cards; each card having an identical identifying design on the back side, wherein 31 of the 52 cards are letter cards having one specific letter from the alphabet marked on the face side such that the five vowels A, E, I, O, and U are marked on two of the cards and each of the other letters of the alphabet is marked on one card, and 21 cards are wild cards, such that 3 cards are marked as a single letter wild card; 15 cards are marked as single letter or multiple letter wild cards and 3 cards are marked as 2 times the same letter or more wild cards;

(b) shuffling and stacking the deck face down into one pile for use by a plurality of players;

(c) a player beginning their turn by removing the top card from the stack of face down cards, flipping it over face up and setting it down in a face up pile;

(d) when the face up card is one of the 31 letter cards the player must enunciate a word that pronounces the letter on the face up card as it is pronounced as an alphabet letter such that the player says an alphabet letter while saying a word;

(e) when the face up card is one of the 21 wild cards the player must enunciate a word the pronounces a letter as an alphabet letter per a specific requirement of the wild card;

(f) awarding points to the player upon successful enunciation of a word as follows: one point for the 31 lettered cards, one point for the 3 single letter wild cards; one point for each letter pronounced as an alphabet letter for the single or multiple letter wild cards; two points for the first time plus one point for each additional time the same letter is pronounced as an alphabet letter for the 3 wild cards marked as 2 times the same letter or more; repeating steps (c)-(f) for each player in turn until all the cards in the face down pile have been played; and (h) adding the total points of each player to determine a winner.

2. Saying Words with Words

A method of playing a card game by a plurality of players; comprising (a) providing a deck of 52 playing cards; each card having an identical identifying design on the back side, wherein 31 of the 52 cards are letter cards having one specific letter from the alphabet marked on the face side such that the five vowels A, E, I, O, and U are marked on two of the cards and each of the other letters of the alphabet is marked on one card, and 21 cards are wild cards, such that 3 cards are marked as a single letter wild card; 15 cards are marked as single letter or multiple letter wild cards and 3 cards are marked as 2 times the same letter or more wild cards;

(b) shuffling and stacking the deck face down into one pile for use by a plurality of players;

(c) a player beginning their turn by removing the top card from the stack of face down cards, flipping it over face up and setting it down in a face up pile;

(d) when the face up card is one of the 31 letter cards the player must enunciate a word that enunciates another word or words during its enunciation, but the word enunciated that enunciates another word or words must use the letter on the card as the first letter in its spelling;

(e) when the face up card is one of the 21 wild cards the player must enunciate any word that enunciates another word or words during its enunciation;

(f) awarding points to the player upon successful enunciation of a word as follows: one point for each word that is enunciated during the enunciation of a word that fulfills the requirement of the card played from the deck;

(g) repeating steps (c)-(f) for each player in turn until all the cards in the face down pile have been played; and (h) adding the total points of each player to determine a winner.

3. Saying the Alphabet While Saying Words with Words

A method of playing a card game by a plurality of players; comprising (a) providing a deck of 52 playing cards; each card having an identical identifying design on the back side, wherein 31 of the 52 cards are letter cards having one specific letter from the alphabet marked on the face side such that the five vowels A, E, I, O, and U are marked on two of the cards and each of the other letters of the alphabet is marked on one card, and 21 cards are wild cards, such that 3 cards are marked as a single letter wild card; 15 cards are marked as single letter or multiple letter wild cards and 3 cards are marked as 2 times the same letter or more wild cards;

(b) shuffling and stacking the deck face down into one pile for use by a plurality of players;

(c) a player beginning their turn by removing the top card from the stack of face down cards, flipping it over face up and setting it down in a face up pile;

(d) when the face up card is one of the 31 letter cards the player must enunciate a word that enunciates another word or words during its enunciation and pronounces a letter or letters from the alphabet as an alphabet letter; such that the letter from the card is either the first letter in the spelling of the enunciated word or is pronounced as an alphabet letter during its enunciation;

(e) when the face up card is one of the 21 wild cards the player must enunciate any word that enunciates another word or words during its enunciation and pronounces a letter or letters from the alphabet as an alphabet letter;

(f) awarding points to the player upon successful enunciation of a word as follows: one point for each letter pronounced during the enunciation of the word played, one point for each word that is enunciated during the enunciation of the word played; two points for any word enunciated during the enunciation of the played word that can also double as being a letter pronounced as an alphabet letter;

(g) repeating steps (c)-(f) for each player in turn until all the cards in the face down pile have been played; and (h) adding the total points of each player to determine a winner.

I claim:

1. A method of playing a card game by a plurality of players; comprising (a) providing a deck of 52 playing cards; each card having an identical identifying design on the back side, wherein 31 of the 52 cards are letter cards having one specific letter from the alphabet marked on the face side such that the five vowels A, E, I, O, and U are marked on two of the cards and each of the other letters of the alphabet is marked on one card, and 21 cards are wild cards, such that 3 cards are marked as a single letter wild card; 15 cards are marked as single letter or multiple letter wild cards and 3 cards are marked as 2 times the same letter or more wild cards;

(b) shuffling and stacking the deck face down into one pile for use by a plurality of players;

(c) a player beginning their turn by removing the top card from the stack of face down cards, flipping it over face up and setting it down in a face up pile;

(d) when the face up card is one of the 31 letter cards the player must enunciate a word that pronounces the letter on the face up card as it is pronounced as an alphabet letter such that the player says an alphabet letter while saying a word;

(e) when the face up card is one of the 21 wild cards the player must enunciate a word the pronounces a letter as an alphabet letter per a specific requirement of the wild card;

(f) awarding points to the player upon successful enunciation of a word as follows: one point for the 31 lettered cards, one point for the 3 single letter wild cards; one point for each letter pronounced as an alphabet letter for the 15 single or multiple letter wild cards; two points for the first time plus one point for each additional time the same letter is pronounced as an alphabet letter for the 3 wild cards marked as 2 times the same letter or more;

(g) repeating steps (c)-(f) for each player in turn until all the cards in the face down pile have been played; and (h) adding the total points of each player to determine a winner.

2. A method of playing a card game by a plurality of players; comprising (a) providing a deck of 52 playing cards; each card having an identical identifying design on the back side, wherein 31 of the 52 cards are letter cards having one specific letter from the alphabet marked on the face side such that the five vowels A, E, I, O, and U are marked on two of the cards and each of the other letters of the alphabet is marked on one card, and 21 cards are wild cards, such that 3 cards are marked as a single letter wild card; 15 cards are marked as single letter or multiple letter wild cards and 3 cards are marked as 2 times the same letter or more wild cards;

(b) shuffling and stacking the deck face down into one pile for use by a plurality of players;

(c) a player beginning their turn by removing the top card from the stack of face down cards, flipping it over face up and setting it down in a face up pile;

(d) when the face up card is one of the 31 letter cards the player must enunciate a word that enunciates another word or words during its enunciation, but the word enunciated that enunciates another word or words must use the letter on the card as the first letter in its spelling;

(e) when the face up card is one of the 21 wild cards the player must enunciate any word that enunciates another word or words during its enunciation;

(f) awarding points to the player upon successful enunciation of a word as follows: one point for each word that is enunciated during the enunciation of a word that fulfills the requirement of the card played from the deck;

(g) repeating steps (c)-(f) for each player in turn until all the cards in the face down pile have been played; and (h) adding the total points of each player to determine a winner.

3. A method of playing a card game by a plurality of players; comprising (a) providing a deck of 52 playing cards; each card having an identical identifying design on the back side, wherein 31 of the 52 cards are letter cards having one specific letter from the alphabet marked on the face side such that the five vowels A, E, I, O, and U are marked on two of the cards and each of the other letters of the alphabet is marked on one card, and 21 cards are wild cards, such that 3 cards are marked as a single letter wild card; 15 cards are marked as single letter or multiple letter wild cards and 3 cards are marked as 2 times the same letter or more wild cards;

(b) shuffling and stacking the deck face down into one pile for use by a plurality of players;

(c) a player beginning their turn by removing the top card from the stack of face down cards, flipping it over face up and setting it down in a face up pile;

(d) when the face up card is one of the 31 letter cards the player must enunciate a word that enunciates another word or words during its enunciation and pronounces a letter or letters from the alphabet as an alphabet letter; such that the letter from the card is either the first letter in the spelling of the enunciated word or is pronounced as an alphabet letter during its enunciation;

(e) when the face up card is one of the 21 wild cards the player must enunciate any word that enunciates another word or words during its enunciation and pronounces a letter or letters from the alphabet as an alphabet letter;

(f) awarding points to the player upon successful enunciation of a word as follows: one point for each letter pronounced during the enunciation of the word played, one point for each word that is enunciated during the enunciation of the word played; two points for any word enunciated during the enunciation of the played word that can also double as being a letter pronounced as an alphabet letter;

(g) repeating steps (c)-(f) for each player in turn until all the cards in the face down pile have been played; and (h) adding the total points of each player to determine a winner.

* * * * *